US008681738B2

(12) United States Patent
Breuer

(10) Patent No.: US 8,681,738 B2
(45) Date of Patent: Mar. 25, 2014

(54) HANDOFF PREPARATION METHOD IN RADIO COMMUNICATION SYSTEM

(75) Inventor: Volker Breuer, Bötzow (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 741 days.

(21) Appl. No.: 12/085,762

(22) PCT Filed: Nov. 15, 2006

(86) PCT No.: PCT/EP2006/068503
§ 371 (c)(1),
(2), (4) Date: May 30, 2008

(87) PCT Pub. No.: WO2007/062983
PCT Pub. Date: Jun. 7, 2007

(65) Prior Publication Data
US 2009/0252115 A1 Oct. 8, 2009

(30) Foreign Application Priority Data

Nov. 30, 2005 (DE) .................. 10 2005 057 098

(51) Int. Cl.
H04W 4/00 (2009.01)
(52) U.S. Cl.
USPC ............ 370/331; 370/329; 370/332; 370/334
(58) Field of Classification Search
USPC ........................................................ 370/331
See application file for complete search history.

(56) References Cited

U.S. PATENT DOCUMENTS

| 6,597,679 | B1 | 7/2003 | Willars |
| 6,603,751 | B1 | 8/2003 | Odenwalder |
| 2004/0002334 | A1 | 1/2004 | Lee et al. |
| 2005/0250510 | A1 | 11/2005 | Kaikkonen et al. |
| 2006/0251014 | A1* | 11/2006 | Castor et al. .................. 370/329 |

FOREIGN PATENT DOCUMENTS

| CN | 1433650 A | 7/2003 |
| EP | 1 081 978 A1 | 3/2001 |
| EP | 1 081 979 A1 | 3/2001 |
| EP | 1 117 268 A1 | 7/2001 |
| EP | 1 467 589 A1 | 10/2004 |
| WO | 00/38349 | 6/2000 |
| WO | 01/41492 | 6/2001 |
| WO | 03/043237 A1 | 5/2003 |

OTHER PUBLICATIONS

Universal Mobile Telecommunications System (UMTS); Physical layer; Measurements (FDD); 3GPP TS 25.215, V6.4.0 (Sep. 2005), Release 6; pp. 1-19.
International Search Report for Application No. PCT/EP2006/068503; mailed Mar. 19, 2007.

* cited by examiner

Primary Examiner — Shripal Khajuria
(74) Attorney, Agent, or Firm — Staas & Halsey LLP

(57) ABSTRACT

In a wireless communication system, signals within a connection on a wireless interface are transmitted exclusively in a packet-switched manner between a user station and an access device located on the network. The user station signals a need to measure signals to the access device, the access device sends measurement signaling to the user station, and the user station measures signals of at least one additional access device located on the network at a second frequency range while receiving data packets within the connection at a first frequency range based on the received measurement signaling, the second frequency range being disjunct from the first frequency range.

16 Claims, 2 Drawing Sheets

HANDOFF PREPARATION METHOD IN RADIO COMMUNICATION SYSTEM

CROSS REFERENCE TO RELATED APPLICATIONS

This application is based on and hereby claims priority to German Application No. 10 2005 057 098.4 filed on Nov. 30, 2005, the contents of which are hereby incorporated by reference.

BACKGROUND

Described below are a handoff preparation method in a radio communication system, particularly in a mobile radio system and an access device, a user station and a radio communication system able to carry out such a method.

One of the most important aspects of mobile communication systems is the continuity of mobility and services. Mobile communication systems according to GSM (Global System for Mobile Communication) or WCDMA (Wideband Code Division Multiple Access) and UMTS (Universal Mobile Telecommunications System) respectively offer complete mobility so long as a corresponding spatial coverage with network access devices is guaranteed. In contrast, systems according to WLAN (Wireless Local Area Network) only offer nomadic mobility, which means that no dedicated resource exists or is maintained in these systems whilst a user station communicating via this system is moving out of the area of the radio cell of the local data network.

In the case of the first-mentioned systems with the concept of complete mobility, it is required that the user stations carry out measurements of resources in adjacent cells during the communication in one radio cell or even carry out measurements in cells of other systems when a corresponding service is received. This is used for setting up a corresponding new connection via another cell or another resource in time before leaving the currently supplying cell. The measuring is performed in different manners in different systems, none of the concepts being suitable for extensions of the UMTS standard currently being developed, also known by the term 3G+. These extensions are based on, for example, an increase in usable bandwidths. In comparison with the UMTS networks currently used, in which frequency bands having a frequency width of 5 MHz are provided, frequency widths up to 20 MHz are provided for 3G+, possibly subdivided into a number of subfrequency widths of, for example, 1.25 MHz or 5 MHz. In this context, subscriber terminals will be able to support different frequency bandwidths depending on their technical equipment.

GSM is a system based on TDMA (Time Division Multiple Access) on the basis of the assignment of dedicated resources in the time domain in the uplink (UL) or downlink (DL) direction. Between the reception of data at the corresponding discrete instants of time, the user station can perform measurements. In addition, GSM provides a so-called super or hyper frame structure which also enables so-called multi-slot terminals, that is to say terminals having the capability of receiving simultaneously in a number of time slots, to have an almost continuous reception in order to perform measurements within certain predefined instants of time.

In contrast, UMTS is an FDD (Frequency Division Duplex) system in which the user station is continuously assigned dedicated resources in the uplink direction and in the downlink direction in the form of frequency channels. In order to perform measurements without a loss of data, a compressed mode was introduced. During short time intervals, so-called compressed mode gaps, the transmission of data in the uplink direction and/or in the downlink direction is interrupted which provides the user station with the possibility of performing measurements. In order not to lose some data during the transmission before and after the transmission gap in the compressed mode, the data rate is increased by reducing the spreading factor.

Correspondingly, sufficient time for carrying out measurements on other resources than the currently used resources is provided in the various mobile communication systems, other methods being known apart from the methods described. In these, for example, loss of a certain volume of data is accepted, i.e. the user station carries out measurements whilst the transmission of data to it is continued, and thus loses some data, data lost in this manner being compensated for by coding in higher layers or a new transmission of the data becoming necessary. It is also known to accept the loss of the data with a view to a reduced reproduction quality in the case, e.g. of transmitted voice. In addition, there exists the possibility of providing in the terminals or user stations a dual receiver equipment so that data reception is carried out continuously via a first receiver device whilst a second receiver device carries out the measurements on other resources.

The evolution of the UMTS standard (called 3G+ in the text which follows) is intended to offer complete mobility as a mobile communication system in the manner of a mobile radio system, in connection with which requirements were first specified which mandatorily provide the use of dual receivers. However, this would disadvantageously lead to increased costs of the subscriber terminals and to increased technical complexity. The use of user stations having only one receiver is therefore probable so that for such terminals, methods must be defined which provide for the support of handoffs across frequency bands. In this context, it is a matter of providing for measurements at different frequencies without having to accept the loss of data during the time of the measurement.

In addition, the problem with 3G+ is that this is a system with purely packet-switched data transmission which makes it more complicated to plan the transmission of data packets in comparison with so-called circuit-switched connections since it is intended to provide great possibilities with regard to the cell throughput on the basis of planning algorithms, using approaches according to the maximum throughput, round-robin etc. for this purpose. 2G and 3G are systems which are based on circuit switching and thus support a fundamentally different concept than 3G+ which is designed as a packet-switched system. In the circuit-switched systems, there are also packet-switched components such as HSDPA (High Speed Downlink Packet Access) and EDCH (Enhanced Dedicated Channel) but these are only additional options in order to improve the throughput. This can be seen from the requirements that a dedicated channel has to exist mandatorily in addition to the packet channel. However, 3G+ only has a pure packet channel for data transmission or dedicated data transmission so that the methods currently used for providing transmission or receiving gaps are not suitable for measurements since they are based on dedicated channels and are related to these. To perform measurements on other resources, active dedicated control channels are therefore always required and the user station has to continuously monitor the so-called scheduling channels for the packet-switched transmissions.

SUMMARY

An aspect is a method for performing monitoring of adjacent resources which particularly also enables user stations having only one receiver device to be used without having to accept the loss of data packets to be received. In addition, corresponding access devices at the network side and user stations for carrying out such a method are to be proposed.

Accordingly, a method for performing intra-system frequency monitoring, inter-frequency monitoring and/or inter-system monitoring in a mobile radio system with purely packet-switched radio connections between a user station and an access device is described in which the user station, between receiving data packets within a first frequency range, performs measurements within a frequency range other than the first frequency range or in a system other than the receiving system, the user station signals to the access device a requirement for carrying out measurements, the access device thereupon transmits measurement signaling to the user station and user station, on the basis of the measurement signaling, subsequently carries out measurements without loss of data packets to be received.

In this context, the user station, according to a first embodiment, adjusts its receiver device, for the inter-frequency monitoring or the inter-system monitoring, for a limited period to another frequency which is not suitable for receiving the data via the first frequency. The user station signals the requirement indirectly and implicitly by reporting a quality of reception to the access device and the access device decides a requirement if the quality of reception is too low and then transmits the measurement signaling. The access device, after transmitting the measurement signaling for a limited period of time, changes to a predetermined time domain planning mode and signals this together with the measurement signaling to the user station, data packets with mutually different data being transmitted with a time interval which is sufficiently large for the measurement. In this arrangement, the data packets having the same data are transmitted repeatedly as long as an indicator flag allocated to the data packets signals this and/or different data packets with mutually different data are transmitted with a time interval which is in each case sufficiently large.

The access device increases a transmitting power for at least one data packet for reducing the probability of a required retransmission, particularly in the case of an elaborate measurement signaled by the user station. A data packet can be transmitted additionally in parallel as a copy via another subcarrier, particularly via another frequency. The access device can signal a period between the transmission of two successive data packets with mutually different data to the user station.

According to a second embodiment, the user station performs measurements in a receiving frequency band with the first frequency range which is narrower than a transmitting frequency band with a basic frequency range in which the measurement would have to be carried out. The user station can carry out measurements via pilot signals which are distributed in the transmitting frequency band, wherein, however, a channel rendering the adjacent cell identifiable lies outside the first frequency range, the user station signaling to the access device a received power of such a pilot signal so that the access device can determine a requirement for a measurement.

If the user station cannot receive a channel rendering an adjacent cell identifiable in its first frequency range, it signals this to the access device whereupon the user station is assigned a second frequency range as new frequency range by or via the access device so that the user station can subsequently perform measurements in an altered second frequency range, data packets for the user station then being transmitted to the user station in the second frequency range instead of the first frequency range.

The access device can assign an adjustment of the receiving frequency band of the user station to another frequency range within the basic transmitting range by the measurement signaling and subsequently transmit data via at least one new first frequency within the other frequency range, wherein the frequency required for the measurement is preferably directly within the receiving frequency range to be newly set in an adjacent cell. Otherwise, a new frequency range is repeatedly assigned.

Correspondingly, an access device having a transmitting and receiving device for setting up a radio interface to a user station and a control device for operating the radio interface and the transmission of data packets is described, wherein the control device or a control device, connected to the access device, of a radio communication system is set up for performing the method.

Correspondingly, a user station with a transmitting and receiving device for setting up a radio interface to an access device and a control device for operating the radio interface and the transmission and reception of data packets is also described, the control device being set up for carrying out the method.

In the sense of 3G+, a purely packet-switched system or purely packet-switched connections between a user station and an access device are understood to be connections in mobile radio systems which operate without a direct connection and without a parallel dedicated connection. Any broadcasting channel which may be present is not used for transmitting dedicated data and useful data and correspondingly can exist in parallel with such a purely packet-switched connection between a user station and an access device.

According to a first concept, the data transmission is planned to take place in the form of data packets with one or more fixed time intervals over a predetermined period so that measurements can be carried out on other resources. According to a second independent concept, it is taken into consideration that a user station possibly operates in a receiving frequency band in which no adequate information can be received about adjacent resources wherein, in this case, the user station is assigned a different frequency band for receiving data packets and the data packets for this user station are correspondingly transmitted in the other frequency band so that the user station then receives in a frequency band in which sufficient information of adjacent resources can be received. It can be optionally provided that for this purpose the receiving frequency band is changed until the user station is receiving in a suitable receiving frequency band.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
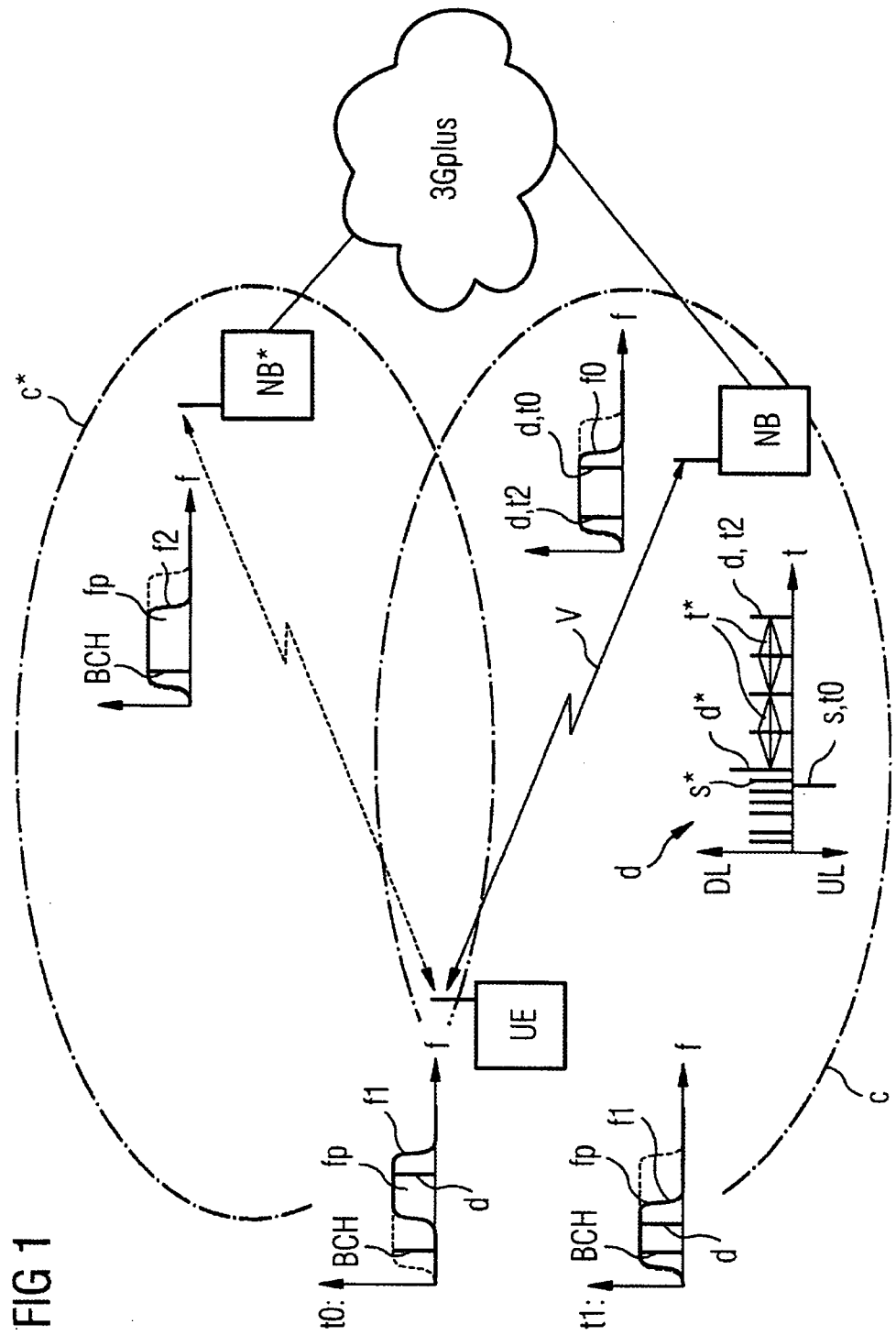
FIG. 1 diagrammatically shows an exemplary user station which receives data of a first access device at the network side in a first radio cell and is additionally located in the area of a second radio cell, the resources of which are to be monitored.

Reference will now be made in detail to the preferred embodiments, examples of which are illustrated in the accompanying drawings, wherein like reference numerals refer to like elements throughout.

FIG. 1 shows by way of example an arrangement with a user station UE as an end user device which communicates via a radio interface V with an access device NB, typically called NodeB, of a mobile radio system as a radio-supported communication system. The mobile radio system shown is, in particular, a system according to the 3G+ standard in which purely packet-switched connections are set up between the access devices NB, NB* and user stations UE via the radio interface V. Such a system does not need a connection via a dedicated channel or a connection via a dedicated channel set up in parallel with packet-switched channels.

Correspondingly, data packets d, d* are transmitted as required via channels of the radio interface V which are assigned once. In this arrangement, there is no coordination to fixed points in time or time slots over time t, or at least not mandatorily so. As can be seen from the timing diagram, data packets d, d* are transmitted as required from the access device NB located on the network side in the downlink direction DL to the user station UE and/or from the user station UE in the uplink direction UL to the access device NB. The data packets d, d* can be used for transmitting pure useful data. However, the transmission of signaling data in addition to useful data and of only signaling data in corresponding further data packets s, s* is also possible.

The access device NB located on the network side can usually have data packets for transmitting over certain frequencies within a very large basic frequency range f0 as is outlined by the diagram, shown above the access device NB, of the frequency spectrum over frequency f used. In contrast, inexpensive user stations, in particular, only have a limited available frequency spectrum, the user station UE shown being able to receive only data packets within a first frequency range f1 at a first time t0. The first frequency range f1 shown by way of example corresponds to the upper frequency range of the basic frequency range f0 available to the access device NB. This first frequency range f1 is usually assigned when the user station UE logs into the mobile radio system, wherein the mobile radio system or corresponding control devices in it specify at the same time that the access device is allowed to transmit data packets d only via frequencies within the first frequency range f1 to the user station UE.

In the exemplary embodiment shown, the user station UE is not only located within a radio cell c of the first access device NB but also in the edge area of a second radio cell C* of a further access device NB* located on the network side. This further access device NB* can be an access device of the same mobile radio system to which the first access device NB is also allocated. However, it can also be a further network access device NB* of a further mobile radio system of the same standard if the two mobile radio systems are then connected to one another directly or via third systems and provide for a handoff of a connection of the user station UE from the first access device NB to the second access device NB* as is generally customary in mobile radio systems. In the exemplary embodiment shown, the exemplary further network access device NB* is intended to use a second frequency range f2 for sending data packets and signaling.

In particular, a broadcasting channel BCH, for transmitting general information to user stations logging in, e.g., is intended to transmit in a frequency range which is outside the first frequency range f1 within which the user station UE is ready to receive. For example, an identification code of the access device NB, NB* located on the network side can be distributed via such a broadcasting channel. This only enables the user station UE to perform measurements of channels of the second radio cell c* or of the further access device NB*, respectively, only in a frequency range in which the first frequency range f1 and second frequency range f2 overlap. As a result, it may be possible to determine intensities of certain channels, particularly pilot signal channels, but not also identification information for unambiguously identifying the further access device NB*.

To perform a measurement in the second radio cell c* with the further access device NB* located on the network side, wherein none of the data packets d transmitted and to be received by the first access device NB are intended to be lost, a procedure according to a first embodiment is described wherein, according to the method, inter-frequency monitoring and/or inter-system monitoring is used as scenario. According to the method, the user station UE transmits, if necessary, in order to perform a measurement in a neighboring cell, in this case in the second cell c*, signaling s in the form of in particular a special signaling data packet at a first time t0 via the radio interface V to the access device NB. The access device NB located on the network side and/or a control device of the mobile radio system connected to the access device thereupon sends a corresponding measurement signaling s* in the downlink direction DL to the user station UE. In addition, it is initiated that subsequently one or more time gaps are provided aligned in the transmission of data packets d. The time gaps are selected in such a manner that a time interval t* exists for the user station UE which is large enough to change the receiving frequency to a frequency range via which corresponding measurements are possible in the adjacent second cell c* or a second resource or are presumably possible. Should there be other frequency ranges in which measurements can be possibly carried out in the second cell c*, subsequent time intervals t* between the transmission of data packets d can be used for also performing corresponding measurements in such further possible frequency ranges.

So that the user station UE obtains knowledge of the times of the time gaps, the measurement signaling s* is transmitted to the user station UE. It can be provided that, on reception of a measurement signaling s*, a permanently predetermined time sequence must be maintained during the sending out of data packets d by the access device NB so that the time intervals t* for measurements are predetermined in the manner of a standardization in relation to the system. However, such basic information can be specified not only as part of general standardization but can also be reported to the user station UE at regular time intervals via data packets and/or during its logging-on in the mobile radio system via the access device NB and/or via a broadcasting channel BCH. In addition, there is the possibility of transmitting the information about the beginning and/or the end and/or the duration of the time interval t* by the measurement signaling s* itself individually from the access device NB to the user station UE.

The transmission of a data packet d* from the access device NB to the user station UE at the beginning or immediately before such a time gap with increased power as is outlined in the timing diagram is also advantageous. The increased power for sending out this data packet d* relative to the transmitting power of the remaining data packets d offers the advantage of a transmission via the radio interface V with reduced risk of loss due to interfering influences so that retransmissions of the data packet d* or redundant transmissions of data of the data packet d* by further data packets are now only required to a reduced extent or possibly not at all. Independently of this, such a variation of power of the transmitting power, particularly in the case of a transmitting power which is otherwise used constantly, can also be used for signaling a subsequent time gap instead of an independent measurement signaling s*.

In the case of the inter-frequency scenario or of the inter-system scenario, in particular, a user station UE with only a single receiver tunes its receiver for a predetermined period to another frequency at which a measurement is performed, as a result of which, however, the user station UE is not able to receive transmissions from the radio cell c currently serving it. 3G+ as the exemplary mobile radio system is a packet-switched system so that its planning device or planning entity has two degrees of freedom, on the one hand a division in time and, on the other hand, a subcarrier/frequency division.

A time-dependent planning approach enables the planning entity to use the instants which provide for the best possible quality of transmission for the planning. In such a case, however, the instants at which transmissions to the user station UE are actually planned are possibly known only to a certain extent or not at all for the user station. In consequence, transmitted data packets can be lost to the user station, which performs measurements at another frequency, during an arbitrary switching of the frequency for the purpose of measuring. Such a loss should be avoided. A corresponding method for performing measurements at another frequency outside its own first frequency range f1 is performed by the user station UE, particularly if no suitable intra-frequency neighbor is detected within its own frequency range f1 and the quality of the first cell c1 serving the user station UE becomes too low.

In such a case, the user station UE signals the need for a measurement by suitable signaling s in the uplink direction UL. In this context, the signaling s can also occur indirectly by the user station UE reporting the current quality of reception of the cell c serving it, in arbitrary or also permanently predetermined time intervals in the uplink direction UL. Due to this report, the access device NB or a control device or control entity connected to it can then decide whether it is necessary for the user station UE to perform measurements. If so, the access device NB changes into a regular planning mode in the time domain and signals this to the user station UE by the measurement signaling s*. As an alternative, it can also be provided, naturally, that following corresponding signaling s of the user station UE, the network device NB initiates a corresponding measurement signaling s* in each case.

According to a first variant, a certain time difference between two data transmissions, that is to say the interval between two data packets d transmitted in the downlink direction DL, can be signaled, this being appropriate, in particular, in cases in which large time gaps or intervals t* between two planning times are required for transmitting data. As an alternative, and simpler and more suitable in the case of a user station UE frequently receiving data packets, is the sending of an indicator flag s° by the access device NB, the indicator flag s°, as measurement signaling, signaling a regular planning mode as is outlined in FIG. 2. Due to the reception of this indicator flag s°, the user station UE recognizes that over a period between the data block or data packet which contains the indicator flag s° and the next data packet, the transmission of data packets preferably having in each case identical data is repeated for each subsequent planning time until the indicator flag is deleted again.

The indicator flag s° can be deleted by the access device NB on the basis of the reception of signaling by the user station UE. The signaling of the user station UE which can also be used, in principal, in other variants, can indicate that a suitable inter-frequency cell or suitable inter-frequency system was identified or the quality of its own serving cell c is above a certain threshold value including taking into consideration a hysteresis so that no change is required in the latter case. The access device NB subsequently sends in the usual manner data packets at preferably arbitrary times until it receives new signaling s for signaling a need for measurement by the user station UE. Depending on the result, particularly in the case of a cell change or system change by the user station UE which does not have to be performed, the usual planning of the transmission of data packets is resumed.

Such an indicator in the form of the indicator flag s° for initiating regular planning with fixed time gaps or intervals t* is particularly suitable for services which are not performed in real time (non real-time services). However, such an indicator can also be advantageously used for real time services as in the case of a transmission of voice since, in principle, there is no requirement for always providing a predetermined identical transmission gap between two successive blocks or data packets also in real-time services. Furthermore, different segmenting of a real-time service, for example of voice frames, and corresponding planning, particularly with increased power, can optimize the measuring capabilities. For example, it is assumed in VoIP (Voice-over-Internet Protocol) via HSDPA that a voice frame with 20 ms is compressed into a 2 ms data burst and that such a burst is transmitted regularly every 20 ms.

It is also possible to use an approach with time-dependent planning with the same magnitude for 3G+. For example, in the case of the compression of a voice frame at a ratio of 10 and the transmission of this compressed burst every 10-40 ms, a clear compromise is made between the number of transmissions and the time between the transmissions due to IP overloading. Shortening voice frames leads to a very poor ratio of raw bits to data bits in the case of long periods between the transmission so that the voice quality can suffer due to the requirement of retransmissions. A suitable value in such an example can therefore be selected of the order of magnitude of 10-20 ms. With increasing duration of the periods between the transmissions of data packets, on the other hand, the usability for measurements is all the higher since switching times etc. do not need to be subtracted. In consequence, it is particularly advantageous that, in the case of the requirement of an excessive measurement by the user station UE, greater block segmenting can be used by the access device NB.

In such a case, in particular, the increase in transmitting power, preferably already for the first transmission of a subsequent data packet d*, possibly also for the transmission of further data packets, to an increased value is advantageous in order to reduce the requirement of retransmissions and to enable the user station UE to optimally utilize the time between transmissions of data packets d*, d for measurements. In such a case, corresponding signaling and transmission of corresponding data packets can also be advantageously carried out by using an indicator for the regular planning in the manner of the indicator flag s°.

Independently of this, in the case where an indicator flag s° is set for the regular planning of transmission times, any required retransmission of a data packet can be carried out in parallel and preferably at the same time as the continuing regular transmissions on a different branch or subcarrier.

Setting the indicator flag s° for regular planning by the access device NB can also be considered as a direct request by the access device NB to the user station UE to perform inter-system measurements and/or inter-frequency measurements according to a measurement priority list previously predetermined. The procedure is carried out as if the system intends to hand over the user station UE to another system, the other system e.g. having less loading or being generally more suitable for a requested type of service.

Figure 2:
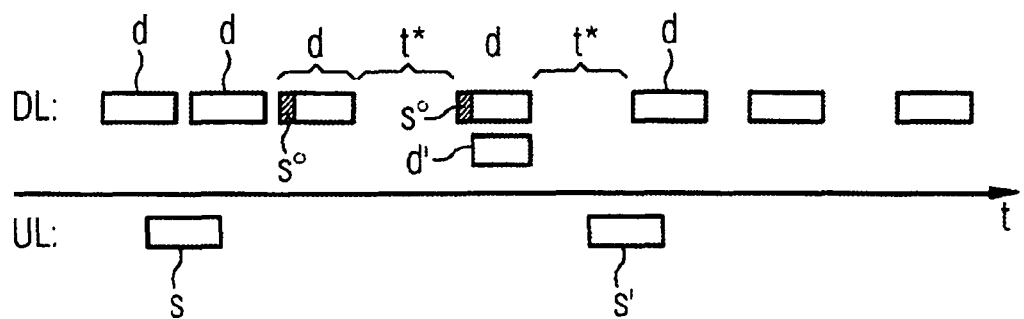
FIG. 2 diagrammatically shows a data transmission and signaling sequence according to a first embodiment.

FIG. 2 outlines a sequence of data packets d which are transmitted in sequence in time from the access device NB located on the network side to the user station UE as can also be seen essentially from FIG. 1. It is shown that the access device NB signals by an indicator flag s° at the beginning of a data packet d to the user station UE, that subsequently a transmission of data packets with sufficiently large time intervals t* between individual data packets d is carried out in order to enable the user station to perform measurements on other carriers and/or systems. As soon as a data packet d is received without an indicator flag s° being set as introduction by the user station UE, the user station UE recognizes from this that no further time intervals t* are provided and data packets d are subsequently transmitted in the usual manner and particularly uncontrolled in time. It is also shown that a first retransmission of the second data packet d* is carried out via, for example, a parallel carrier or subcarrier, that is to say e.g. via a further frequency within the frequency range f1 which can be received by the user station UE. Using the same subcarrier branch in the case of the indicator flag s° being set for regular planning with predetermined time intervals t* only represents one option, wherein any subcarrier in the received band of the user station UE can be used. However, using the same subcarrier can facilitate the situation for frequency hops for the user station UE. The indicator flag s° is advantageously but not mandatorily set by the access device NB until the user station UE has signaled the successful conclusion of the measurements to the access device NB.

Procedures are also possible in which the regular planning mode is carried out at predetermined fixed time intervals t* with a different cycle in time. This means that, with the indicator flag s° set, the access device NB signals that the regular planning for this user station UE is maintained, but with a different periodicity.

Figure 3:
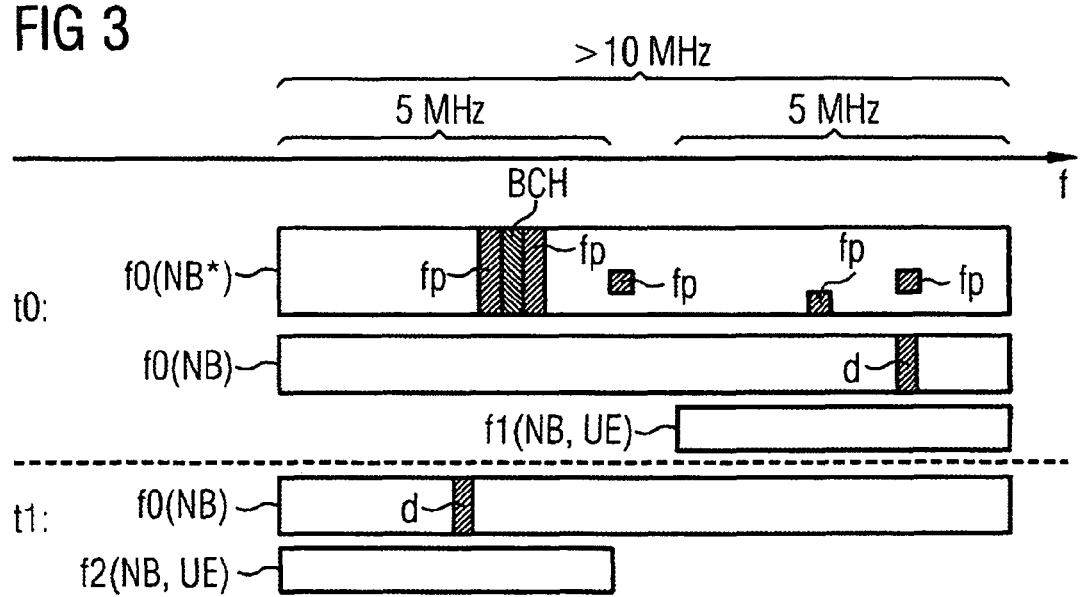
FIG. 3 diagrammatically shows frequency bands used by different devices before and after a change of a receiving frequency band of the user station.

FIGS. 1 and 3 illustrate a second exemplary embodiment for carrying out measurements or, respectively, for carrying out so-called monitoring by the user station UE, the user station UE being assigned, if necessary, the use of another, second frequency range f2 instead of a hitherto used first frequency range f1 by the devices located on the network side, particularly by the access device NB. The user station UE preferably signals, via the radio interface V of the access device NB located on the network side, the need of having to carry out intra-frequency monitoring as measurement since it cannot carry out adequate measurements in a second cell c* or from a second access device NB* in the first frequency range f1 assigned to it. At a first time t0, the user station UE receives with its receiver device frequencies in a first frequency range f1 as the receiving band previously assigned to it. Correspondingly, the first access device NB sends data d in this first frequency range f1 although, in principle, a greater basic frequency range f0 is available to the access device NB. The further access device NB* of an adjacent and partially overlapping second cell c* also transmits in this basic frequency range f0. Distributed over the frequency range are pilot signals fp which partially fall into the first frequency range f1 which is received by the user station UE. Correspondingly, the user station UE can recognize that a further cell c* is receivable. However, the user station UE cannot adequately identify this further cell c* since a broadcasting channel BCH of the further second cell c* is outside the first frequency range f1.

After signaling s by the user station UE to its associated access device NB, the access device NB or a control device connected to it assigns to the user station UE a second frequency range f2, which takes place via corresponding measurement signaling s*. Following this, the user station UE, by corresponding new tuning of its available frequency range to the second frequency range f2, changes to the second frequency range f2. As can be seen from FIG. 3 at the bottom, the user station UE can receive the broadcasting channel BCH of the second cell c* after the retuning and correspondingly determine all necessary information. So that no loss of data occurs, data packets to be sent out are correspondingly sent to the user station UE at a frequency within the second frequency range f2, together with the retuning of the user station UE to the second frequency range f2. In dependence on time of a later time t1, the user station UE is thus able to receive both the necessary information of the adjacent second cell c* and the data packets d, directed to it, of its own and hitherto assigned network access device NB without loss.

It is of significance to the performance of a communication system that the user station UE can receive or read the broadcasting channel BCH of an adjacent cell c* or can at least identify the adjacent cells c* in passing whilst the reception of data or data packets d is carried out continuously and it is not necessary to wait for certain periods of interruption during the transmission of data packets d. In a particularly manner, a combination with the procedures of the first exemplary embodiment can also be implemented.

In this embodiment, it is taken into consideration that, according to 3G+, not all terminals or user stations UE have the capability of receiving the complete system bandwidth, e.g. 20 MHz, wherein, in particular, low-price terminals will have a restricted receiver capability. In the case of the example described, the user station UE is initially planned only in the upper band of the frequency range f1 whilst an adjacent access device NB* transmits with the same frequency range f0, as the frequency range of its own access device NB transmits its broadcasting channel BCH in the lower range. In this case, the user station UE is not able to completely identify the adjacent cell c*. However, the user station UE can perform measurements of the pilot signals fp which are distributed over the entire bandwidth but will not be able ultimately to completely identify the cell as would be possible in GSM with its BSIC identification (Base Station Identity Code). Correspondingly, the user station UE reports the received pilot power of the adjacent cell c* to the access device NB assigned to it itself and/or indicates via the uplink UL that the broadcasting channel BCH or another channel required for completing the identification information of the adjacent cell c* is not located within the receiver bandwidth of the user station UE. In this context, the user station UE can advantageously convey, as part of the signaling s, the frequency range f1 which it can currently observe, unless this is already known to the access device NB serving the user station UE.

On the basis of such information, the access device NB can begin to include the user station UE in the previously unused range of its system bandwidth f0 and signal this to the user station UE by the measurement signaling s*. After a corresponding change from the first frequency range f1 to the second frequency range f2, the required channel, particularly broadcasting channel BCH of the adjacent cell c* also falls within the second frequency range f1 which can be received by the user station UE. It can be optionally provided that other changes are performed if the second frequency range f2 is also not sufficient for obtaining the required information of the adjacent cell c*.

For the user station UE, it can also be required to monitor the broadcasting channel BCH of the adjacent cell c* or a similar channel or a channel configuration over a particular time in order to ultimately identify its access device NB*. For example, the broadcasting channel BCH can contain an identification signature or identification number for this purpose. The subcarrier used for the broadcasting channel BCH and the color code of the surrounding pilot channels could also be used as a distinguishing feature between the access devices NB, NB*.

In the example outlined by FIG. 3, an exemplary system bandwidth of a basic frequency range f0 of 10 MHz and a minimum receiver capacity of 5 MHz of the user station UE is assumed. If no knowledge with respect to the user station receiver capacity is available in the network, resetting of the frequency range of the user station UE can also be carried out repeatedly several times, for example four times in the case of a system bandwidth of 20 MHz and a receiver bandwidth of the user station UE of at least 5 MHz, until the neighboring cell or its broadcasting channel BCH has been found by the user station UE. The aim of the procedure is ultimately that the user station UE can receive both its own data packets and necessary information from adjacent cells within its frequency range f2.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method of preparing a handoff of a user station in a radio communication system from a first access device to a second access device, comprising:
   transmitting from the first access device to the user station scheduling and measurement signaling, signal transmission within a connection on a radio interface between the user station and the first access device occurring under control of a data packet scheduler in packet-switched mode; and
   receiving data packets within a connection in a first frequency range between the first access device and the user station while carrying out at the user station, based on the measurement signaling, measurements of signals in a second frequency range disjoint from the first frequency range, and
   wherein scheduling of resources by the data packet scheduler includes scheduling of measurements of signals to be performed by a mobile station in the second frequency range during a limited period of time and scheduling of transmissions gaps in the first frequency range, and
   where data packets are transmitted with a time interval dimensioned for carrying out the measurements.

2. The method as claimed in claim 1, wherein the first and at least one other access devices are each allocated to either an identical or a different radio communication system.

3. The method as claimed in claim 1, wherein measurements of the signals in the second frequency range is carried out at the user station.

4. The method as claimed in claim 3, comprising:
   wherein said signaling of a requirement by the user station includes signaling a measured quality of reception to the first access device, and
   wherein said transmitting of the measurement signaling to the user station by the first access device is dependent on the measured quality of reception being below a predetermined threshold value.

5. The method as claimed in claim 4, wherein said transmitting of the measurement signaling by the first access device, after sending out the measurement signaling for a limited period of time, changes to a predetermined time domain planning mode where data packets of the connection are transmitted with a time interval dimensioned for carrying out the measurements.

6. The method as claimed in claim 5, wherein the time domain planning mode is signaled to the user station by an indicator flag allocated to the data packets.

7. The method as claimed in claim 6, wherein, in case of measurements exceeding the limited period of time, the first access device increases a transmitting power for at least one data packet.

8. The method as claimed in claim 7, further comprising transmitting a data packet in the first frequency range in parallel on at least two subfrequency bands by the first access device.

9. The method as claimed in claim 8, further comprising signaling from the first access device to the user station the time interval between transmissions of two successive data packets having different content.

10. The method as claimed in claim 9, wherein the first and the second frequency range are allocated to a common basic frequency range.

11. The method as claimed in claim 10, comprising:
    carrying out measurements of pilot signals of the at least one other access device in the first frequency range; and
    signaling measured received powers to the first access device.

12. The method as claimed in claim 11, wherein, for the signal transmission within the connection, the second frequency range is assigned to the user station for receiving a broadcasting channel of the at least one other access device.

13. The method as claimed in claim 12, further comprising signaling by the first access device to the user station an assignment of the second frequency range by measurement signaling.

14. An access device of a radio communication system providing communication for a user station, comprising:
    at least one transmitting and receiving device transmitting and receiving data packets within a connection in a first frequency range on a radio interface to the user station; and
    at least one control device generating scheduling and measurement signaling after receiving a need, signaled by the user station, for carrying out measurements of signals in a second frequency range disjoint from the first frequency range, and controlling sending of the scheduling and measurement signaling to the user station by the transmitting and receiving device, signal transmission within a connection on a radio interface between the user station and the first access device occurring under control of a data packet scheduler in packet-switched mode, and wherein the scheduling of resources by a data packet scheduler includes scheduling of measurements of signals to be performed by a mobile station in the second frequency range during a limited period of time and scheduling of transmissions gaps in the first frequency range, and where data packets are transmitted with a time interval dimensioned for carrying out the measurements.

15. A user station of a radio communication system, comprising:

at least one transmitting and receiving device transmitting and receiving data packets within a connection in a first frequency range on a radio interface to an access device of the radio communication system; and at least one control device signalling a need for carrying out measurements of signals, receiving scheduling and measurement signalling from the access device and carrying out measurements of signals in a second frequency range disjoint from the first frequency range during transmission gaps of the data packet transmission from the access device, signal transmission within a connection on a radio interface between the user station and the first access device occurring under control of a data packet scheduler in packet-switched mode, and scheduling includes scheduling of measurements of signals to be performed by a mobile station in the second frequency range during a limited period of time and scheduling of transmissions gaps in the first frequency range, and where data packets are transmitted with a time interval dimensioned for carrying out the measurements.

16. A method of preparing a handoff of a user station in a radio communication system from a first access device to a second access device, comprising:

transmitting from the first access device to the user station scheduling and measurement signaling, signal transmission within a connection on a radio interface between the user station and the first access device occurring under control of a data packet scheduler in packet-switched mode; and receiving data packets within a connection in a first frequency range between the first access device and the user station while carrying out at the user station, based on the measurement signaling, measurements of signals in a second frequency range disjoint from the first frequency range, and wherein the scheduling of resources by the data packet scheduler includes scheduling of measurements of signals to be performed by a mobile station in the second frequency range during a limited period of time and scheduling of transmissions gaps in the first frequency range, and where data packets are transmitted with a time interval dimensioned for carrying out the measurements.

* * * * *